Jan. 2, 1945.   W. B. GRIFFITH   2,366,520
VALVE SEAT RING
Filed Nov. 2, 1943

Inventor:
William B. Griffith
By P. DeWitt Goodwin
Attorney

Patented Jan. 2, 1945

2,366,520

UNITED STATES PATENT OFFICE 2,366,520

VALVE SEAT RING

William B. Griffith, Stone Harbor, N. J.

Application November 2, 1943, Serial No. 508,722

2 Claims. (Cl. 251—167)

My invention relates to improvements in valve seat rings and particularly relates to valve rings made of soft flexible rubber, adapted for use upon valves of the type employed in sprinkler systems for fire protection purposes.

Valves having a seat element and a clapper element movable to and from the seat element have employed a flexible seat ring, between said elements, which ring is urged by the water under pressure into a position to form a seal between said elements. A valve of ths type is disclosed in the German patent to Ackermann, No. 432,865, of 1926.

Heretofore in the use of valve rings of this type difficulty has been experienced in retaining the seat rings upon the valve seat element, which latter is provided with an annular recess formed therein, in which recess the seat ring is inserted. Various constructions of clamping means have also been employed for securing the seat ring, such as clamp plates, and clamp rings, secured by bronze screws, which screws become corroded after a period of time, making them difficult to remove when it becomes necessary to renew the valve seat ring, frequently involving considerable expense in reboring and retapping the screw holes.

The object of my invention is to provide means for detachably securing a flexible valve seat ring upon a valve element so that the ring may be readily installed, and also removed when it is desired to renew the seat ring.

A further object is to provide a detachable retaining ring adapted for impinging the seat ring and securely retaining the latter upon the valve element.

A further object is to provide a retaining ring, of the split ring type, so constructed that it will maintain its normal diameter against compression, thus insuring the retaining ring against displacement upon the valve element and also securing the valve seat ring upon said element when the seat ring becomes deteriorated.

A further object is to construct a flexible seat ring with a body portion adapted to occupy a recess formed in the valve element, and provide said body portion with an inwardly projecting flange forming the seat ring proper.

A further object is to provide the body portion of the seat ring with an annular groove adapted for receiving the retaining ring.

A further object is to construct the retaining ring with a projection, or handle, adapted for readily removing the retaining ring from the valve element.

These together with various other novel features of construction and arrangement of the parts, which will be more fully hereinafter described and claimed, constitute my invention.

Referring to the accompanying drawing.

In the accompanying drawing, in which like reference characters refer to like parts, 5 represents a valve of standard construction, adapted for use in sprinkler systems for fire protection.

Figure 1:
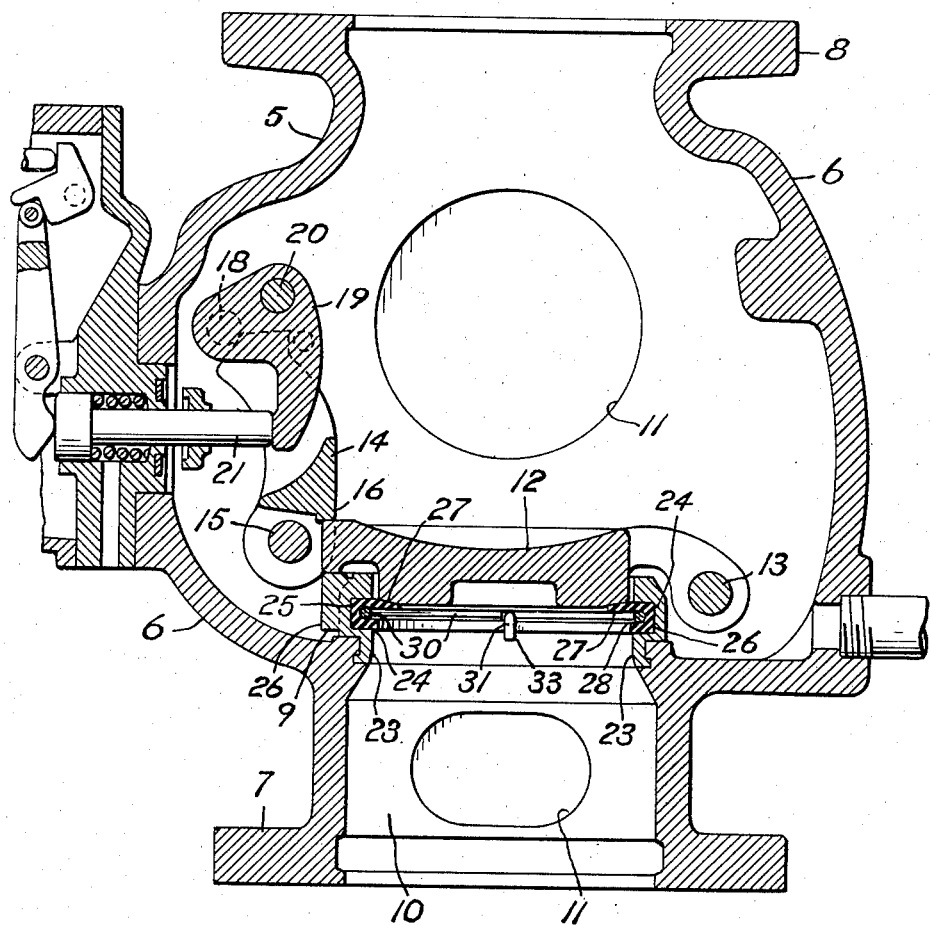
Fig. 1 is a central vertical sectional view of a valve embodying my invention.
Figure 2:
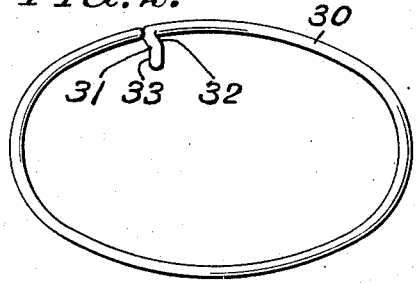
Fig. 2 is an enlarged perspective view of the retaining ring shown in Fig. 1, detached.
Figure 3:
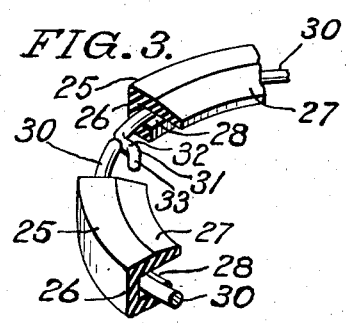
Fig. 3 is an enlarged perspective view, partly in section, showing the valve seat ring and the retaining ring, detached.

The valve 5 is of the deluge type and comprises a casing 6, having an inlet connection 7 adapted for attachment to a water supply pipe, and an outlet connection 8, adapted for connection with a sprinkler system, not shown in the drawing.

The casing 6 is provided with a valve seat element 9, surrounding a passage 10 extending from the inlet connection 7. A clapper element 12 is pivotally mounted upon a shaft 13, located within the casing 6 and is adapted for opening and closing the passage 10. The casing 6 is provided with the usual hand-holes 11.

The clapper element 12 is adapted to be locked in the closed position, shown in Fig. 1, by means of a latch lever 14, pivoted upon a shaft 15. Said lever 14 has a shoulder 16 adapted for engaging the clapper 12 for holding it upon the seat element 9. The outer end of the lever 14 is engaged by a pin 18 on a rocking lever 19, pivoted on a shaft 20. Said lever 19 is held against movement by a plunger 21, which in turn is controlled by a releasing device of standard construction, in a manner well known in the art. When the plunger 21 is released, the levers 14 and 19 will reelase the clapper 12, which latter will be forced to the open position by the pressure of the water in the passage 10.

The valve seat element 9 includes a annular collar 23, formed integral with, or attached to the casing 6, and adapted for supporting the clapper 12, when the latter is locked upon the seat element 9, by the lever 14, as shown in Fig. 1.

The collar 23 is provided with an annular recess 24, adapted for mounting a flexible valve seat ring 25 within the valve casing 6. The recess 24 is preferably of rectangular cross-section.

My invention resides in the novel construction of the valve seat ring 25 and the novel means for retaining said seat ring. The seat ring 25 is constructed with a body portion 26 and a relatively thinner flange portion 27, extending inwardly from the body portion toward the center of the ring, and forming the sealing member which is adapted to be tightly held against the valve element 12 by the action of water under pressure within the passage 10.

The body portion 26 of the seat ring 25 is preferably of rectangular form and is provided upon its inner surface with an annular groove 28, into which groove a retaining ring 30 is positioned for retaining the body portion 26 within the recess 24, formed in the seat element 9. Said groove 28 is formed upon the inner surface of the body portion 26 adjacent to the flange 27, so that the retaining ring 30 may be inserted from the passage 10 and impinge the body portion 26 for detachably holding the latter upon the valve element 9.

The retaining ring 30 is preferably formed of spring metal and is of the split ring type, with its ends abutting. The outer diameter of the retaining ring 30 is relatively larger than the inner diameter of the collar 23, so that the retaining ring cannot be displaced from the recess 24 in the event of the seat ring 25 becoming deteriorated. The abutting ends of the retaining ring 30 prevent the latter from being compressed. Said retaining ring maintains its normal diameter and prevents the seat ring 25 from collapsing and from being forced out of said recess 24 by the action of water flowing through the passage 10.

The retaining ring 30 is provided with a projection, or handle 31, comprising a radial portion 32 formed upon one end of the split ring 30 and extending toward the center of the latter. A terminal portion 33 is formed upon said radial portion 32 and extends at right angles to the latter. A tool may be readily inserted under said terminal portion 33 for quickly removing the retaining ring 30, when it is necessary to renew the seat ring 25.

My invention provides means for securing the seat ring 25, and for readily renewing the same. The retaining ring 30 prevents the seat ring 25 from being dislodged and carried into the piping system by an excessive flow of water through the valve, possibly clogging the system and rendering it useless for fire protection purposes. The retaining ring 30 can only be removed from the recess 24 by withdrawing one of the abutting ends of the ring 30 and compressing the latter sufficiently to allow it to be withdrawn from the groove 28 and the recess 24.

My novel construction eliminates the use of screws, heretofore used for holding the clamp rings in engagement with the flexible seat ring, which screws were difficult to remove when corroded, making the renewal of the seat ring an expensive operation. With my construction the retaining ring and the seat ring may be readily removed by having access to the passage 10 through the hand-holes 11, formed in the casing 6, through which a new seat ring may be inserted and secured in place, without disconnecting the valve 5 from the pipe connections.

Various changes in the construction and the arrangement of the parts may be made without departing from my invention.

I claim:

1. A flexible valve seat ring comprising a peripheral body portion, a wide sealing flange upon one end face of said body portion forming a valve seat member extending at right angles to the axis of the ring and defining an axial passage through the ring, a relatively narrower sealing flange upon the opposite end face of said body portion extending toward the center of the ring in spaced parallel relation with the wider flange and defining an annular groove between said flanges, a split resilient retaining ring mounted in said groove between the flanges for holding said body portion distended, an inwardly extending radial portion upon one end of said retaining ring, and means upon said radial portion terminating adjacent to said narrower flange outside of the line of said axial passage for receiving a tool for removing the retaining ring.

2. A flexible valve seat ring comprising a peripheral body portion, a wide sealing flange upon one end face of said body portion forming a valve seat member extending at right angles to the axis of the ring and defining an axial passage through the ring, a relatively narrower sealing flange upon the opposite end face of said body portion extending toward the center of the ring in spaced parallel relation with the wider flange and defining an annular groove between said flanges, a split resilient retaining ring mounted in said groove between the flanges for holding said body portion distended, an inwardly extending radial portion upon one end of the retaining ring, and a terminal portion upon said radial portion extending at right angles to said radial portion and positioned outside of the line of said axial passage for receiving a tool for removing the retaining ring.

WILLIAM B. GRIFFITH.